United States Patent Office.

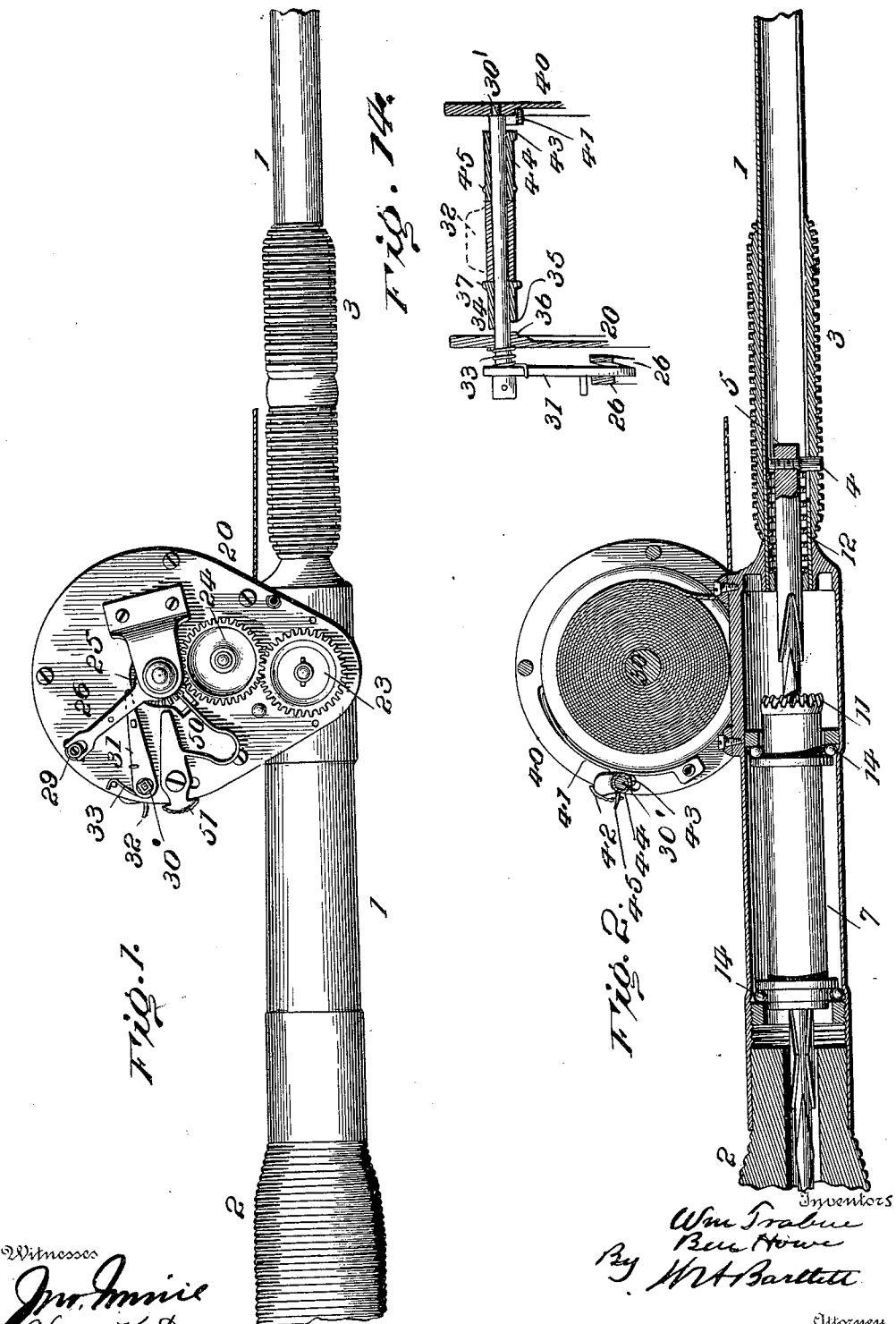

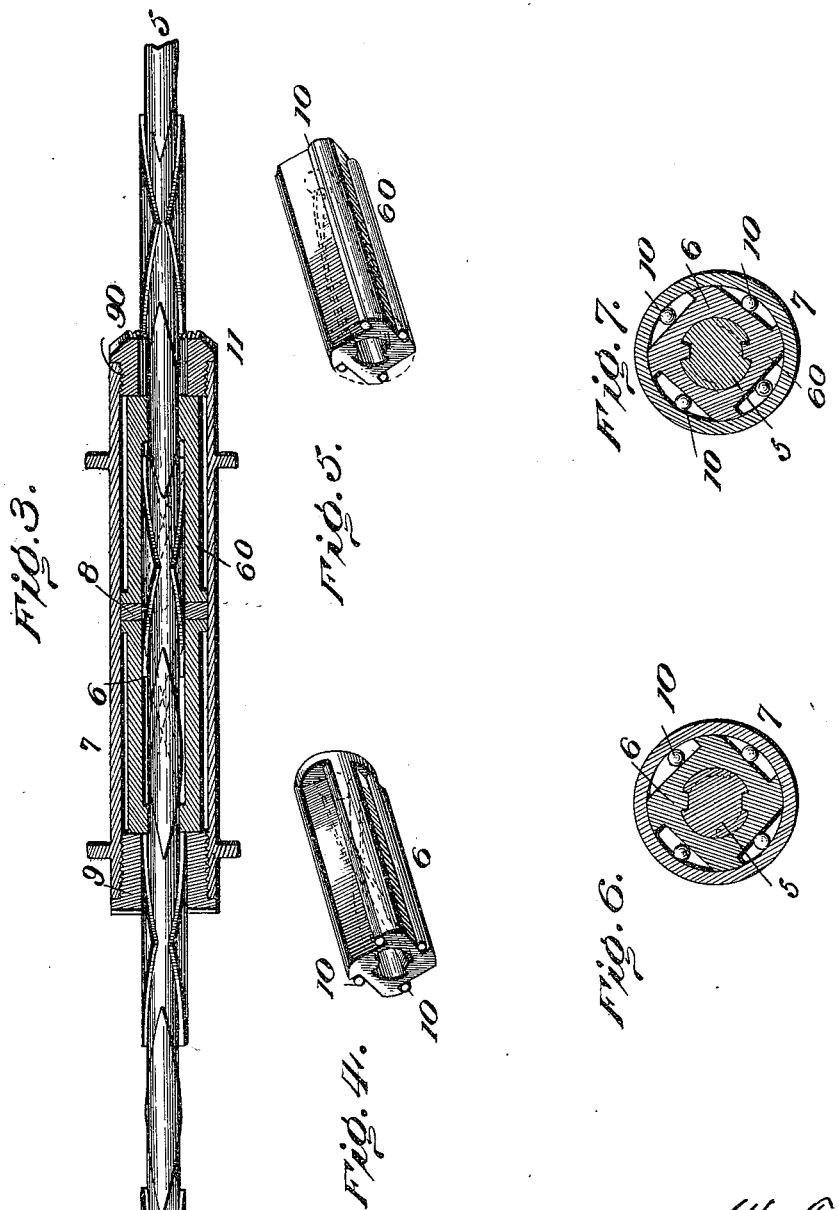

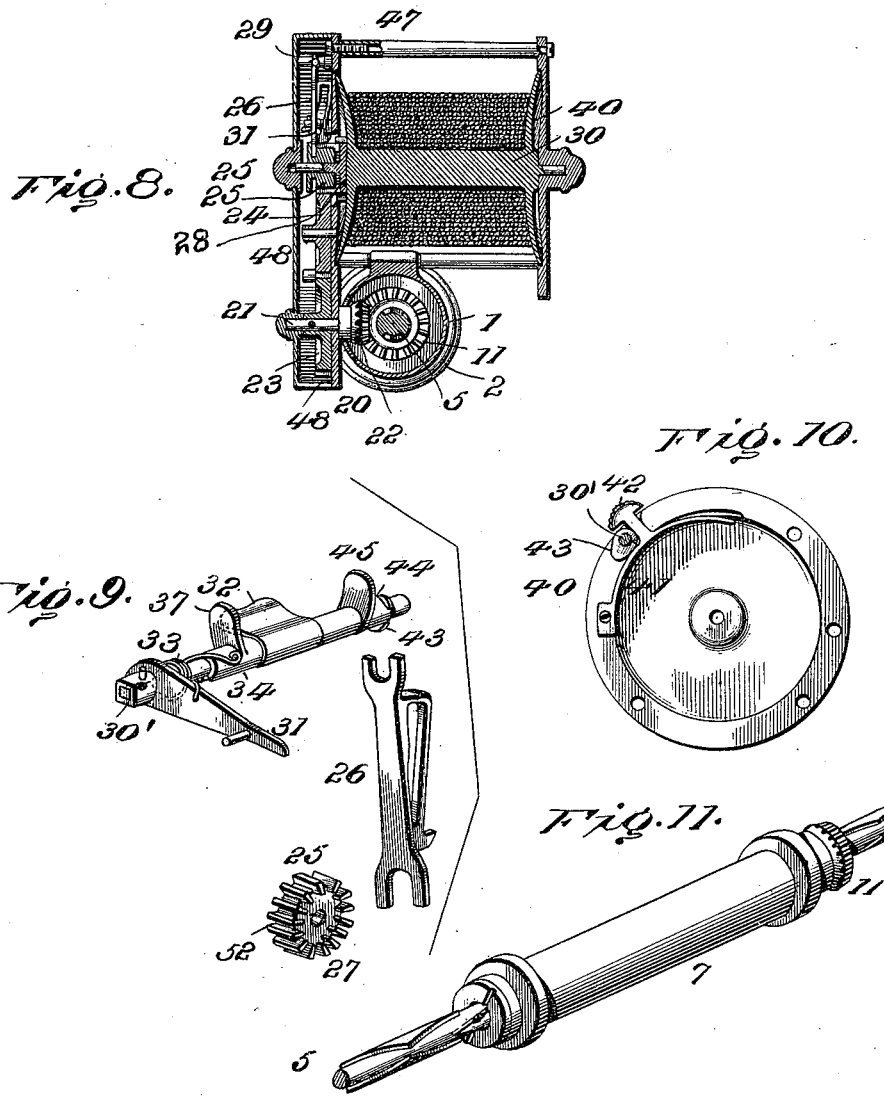

WILLIAM TRABUE AND BEN HOWE, OF LOUISVILLE, KENTUCKY, ASSIGNORS TO THEMSELVES AND ROBERT W. BINGHAM, OF SAME PLACE.

FISHING-REEL.

SPECIFICATION forming part of Letters Patent No. 641,906, dated January 23, 1900.

Application filed October 18, 1899. Serial No. 733,956. (No model.)

*To all whom it may concern:*

Be it known that we, WILLIAM TRABUE and BEN HOWE, citizens of the United States, residing at Louisville, in the county of Jefferson and State of Kentucky, have invented certain new and useful Improvements in Fishing-Reels, of which the following is a specification, reference being had therein to the accompanying drawings.

This invention relates to an improvement in fishing-reels.

The object of the invention is to produce a fishing-reel in which the winding mechanism shall be at all times under control of the operator, who may grasp the rod with both hands and operate the reel to wind in the line by the movement of a sleeve or handle reciprocating on the rod and who may by one hand control the tension of the reel or throw the reel out of engagement.

The special improvements of the present invention are in the mechanism by which the movement of the sleeve on the rod may be short or long and still produce a continuous forward winding of the reel; also, the construction of the operating mechanism and its connections to the reel; also, in some parts of the reel and the mechanism by which it is adapted to different conditions of use.

Figure 1 is a side elevation of part of the butt or handle end of a fishing-rod with reel and operating mechanism attached. Fig. 2 is a central longitudinal section of the same. Fig. 3 is a broken section of the spiral driving-gear and connections. Figs. 4 and 5 are perspective detail views of clutch-sleeve grip-cylinders. Figs. 6 and 7 are cross-sections of the clutch-sleeve and connections. Fig. 8 is a cross-section through the rod at the reel-center, showing general relation of parts. Fig. 9 is a detail showing in perspective and detached the mechanism by which the reel is thrown out of gear so as to run free. Fig. 10 is an end view showing application of the drag. Fig. 11 is a broken perspective of the clutch-sleeve and spiral-grooved spindle. Fig. 12 is a perspective detail of lever-lock. Fig. 13 is an end view of the drag-cam. Fig. 14 is a detail section of rock-shaft and connections.

The rod 1 is of any suitable construction; but for lightness and strength it is generally necessary that the butt-sections shall be of metallic tube or tubes. The extreme rear end of the rod is generally covered by a handle-piece 2, of wood, rubber, bamboo, or other suitable material, to furnish a hand-grasp.

The reel is attached to the rod so as to extend transversely, as usual. In front of the reel by preference a sleeve or handle 3 is arranged to slide lengthwise of the rod. This sleeve is connected by a screw or pin 4 with a grooved cylinder 5 within the rod, the pin 4 passing through a slot in the rod or tube 1.

The cylinder 5 is externally grooved spirally in both directions, as has been known in drills, screw-drivers, and similar tools, and the cylinder 5 passes through two nuts 6 and 60, each having inner threads respectively inclined in the direction of the spiral threads of cylinder 5—that is, nut 6 is driven in one direction by one thread and nut 60 in the other direction by the other thread, and cylinder 5 causes the nuts 6 and 60 to revolve, the nuts being held against longitudinal reciprocation while the cylinder reciprocates lengthwise. The reciprocation of cylinder 5 by the handle 3 is thus made to produce a rotation of the nuts 6 and 60, and as the spiral grooves in cylinder 5 cross each other the change of movement of cylinder 5 from one direction to the other does not prevent the nearly continuous movement of the nuts—that is, the sleeve 3 may be moved in either direction on the rod and with either a short or long stroke and the grooved cylinder will cause the nuts to rotate, but in reverse directions.

The nuts 6 and 60 are inclosed in sleeve 7, each having one end resting against a shoulder or bearing 8 in said sleeve and the other end abutting against a threaded ring 9 or 90, which rings screw into sleeve 7. The nut 6 has flattened outer sides, with extended longitudinal corner ribs, as indicated, the outer surfaces of these ribs being segments of a cylinder, which fits sleeve 7. The flattened sides of the nut form seats for balls or cylinders 10 between the nut or sleeve. The ribs on nut 6 present an abrupt side toward rolls 10. The rotation of the nut in one direction causes the cylinders 10 to engage with sleeve 7, and the nut and sleeve thus become firmly clamped together, while a reverse movement of the nut releases the clutch and leaves the nut free to rotate. As the nut and sleeve are thus clamped together while moving in one direction, this clamping of parts causes the sleeve 7 to rotate when cylinder 5 is reciprocated, as by moving sleeve or handle 3 longitudinally of the rod 1. The clutch on nut 60 acts in the same direction as that on nut 6, but at a different time. Thus one of the nuts acts to move the sleeve 7 when cylinder 5 is moved in one direction and the other when cylinder 5 moves in the reverse direction, one coupling engaging as the other lets go.

Sleeve 7 carries a bevel-gear 11, which gear engages with a train of gears on the reel proper, and thus by the reciprocation of handle 3 the reel may be driven. The reciprocation of handle-piece 3 may be the whole length of the slot in the rod or only a small part of such distance and still the action of the reciprocating movement will be to produce a rotation of gear 11 always in one direction.

To prevent the noise of stopping the handle against a solid abutment or stop, a coiled spring 12 may be inclosed in the tubular rod to act as a buffer at about the end of the slot in the rod. Any other suitable buffer, as a rubber, leather, or pneumatic buffer, might be substituted for the spring, and if the operator does not reciprocate the handle 3 the full length of the slot in the rod the buffer will not be brought into action; but it is better that a buffer should be present.

The sleeve 7 is preferably held in place by ball-bearings, (shown at 14 14.) A suitable support for the balls at each end of the sleeve may be made by constructing collars or projections on the sleeve and corresponding collars within the tube, such construction of bearings to support a sleeve being common in mechanical structures.

The casing or frame plate 20 for the reel has one side or arm extending alongside the fishing-rod, and a transverse shaft 21 is journaled in this extension. On this shaft there is a bevel-gear 22, engaging the bevel-gear 11 of the driving mechanism, and a pinion 23, constituting one of the driving-train of the reel. Pinion 23 engages pinion 24, which is a mere intermediate to convey motion to the clutch-pinion 25 on the axis of the winding-spool 30. When the train is in gear, it is apparent that the spool 30 will be driven by the train of gears described.

Clutch-pinion 25 is carried by a lever 26, so that its face 27 may be thrown into or out of engagement with the clutch member 28 on the spool-shaft. Lever 26 is pivoted to a post or support 29 on the frame, and its other forked end runs in a groove in the clutch-gear 25. A rock-shaft 30' extends across the frame, being journaled at either end in the frame-plates. This rock-shaft has an arm 31, which extends alongside plate 20 and engages an inclined slot in lever 26, and when shaft 30' is rocked this engagement of the lever with the incline serves to lift or lower the end of lever 26 which bears the clutch-gear, and so throw the clutch into or out of engagement. Rock-shaft 30' is rocked in one direction by a spring 33 engaging the shaft and frame and automatically rocking the shaft in such direction that the clutch-gear is normally in engagement to drive the spool. An arm or lever 32, rigid with the rock-shaft 30', serves as a thumb-rest, and by a pressure of the thumb on this lever the shaft may be rocked, and thus the spool-clutch uncoupled, so that the spool may run free.

It is sometimes desirable to fasten the clutch in its uncoupled position, so that the pressure of the thumb on lever 32 may be removed without coupling the spool to the driving-gear. For this purpose a slip-sleeve 34 is arranged on shaft 30'. Sleeve 34 can slide lengthwise on the shaft, but rocks with the shaft. A notch 35 in this sleeve is in position to engage a pin or projection 36 on the frame when the rock-shaft is turned to uncoupling position. When it is desired to fasten the gears in uncoupled position therefore, the thumb is pressed on lever 32 to effect the uncoupling and is then slipped sidewise, bearing on thumb-piece 37 of sleeve 34, and so pressing the sleeve along that its notch engages pin 36, thus holding the rock-shaft from rocking back. A push on sleeve 34 in the other direction unlocks the fastening, so that the clutch-gear may automatically engage under the impulse of spring 33, as has been explained.

When the spool is uncoupled from its driving or winding gear, it is generally desirable that it be under resistance of the drag to prevent it from running too free and thus "overwinding," as it is called. The drag 41 is a spring-piece connected to the frame-plate 40 and lying close to one rim of the spool. A thumb-piece 42 permits a direct pressure to be applied to the drag, and thus the drag may be retarded by direct pressure; but it is also desirable that there be some pressure of the drag when the clutch-gear is uncoupled, as has been stated. The rock-shaft 30' therefore bears a cam 43 on a slip-sleeve 44. By slipping sleeve 44 lengthwise of the rock-shaft toward frame-plate 40 the cam 43 comes in position to be rocked against the drag and will apply pressure thereto when the shaft 30' is rocked to disconnect the gearing. An ear-piece 45 serves to move this slip-sleeve in either direction under impulse of the thumb.

The side plates of the frame are held together by usual cross-bars, as 47. The train of gears is preferably covered by a housing or cover 48.

The alarm or click 50 is a spring connected to lever 51. The rocking of this lever serves to throw the end of spring 50 into contact with the gear 52, which is preferably integral with the clutch member on the spool-shaft. The click will be held by friction either into or out of engagement with the spool.

By the construction described a rod and reel may be produced in which the rod may be at all times held by both hands of the fisherman. The hand-grasp of sleeve or handle 3 does not prevent the use of that hand to cast the line, as a slight longitudinal movement is all that is needed to wind the reel. The butt of the rod may be firmly grasped by the other hand of the fisherman, the thumb of this hand being in position by various movements to couple or uncouple the spool with the driving-gear, or to fasten the gears in free position, or to apply either the drag or alarm or both.

What is claimed herein is—

1. In a fishing-reel, the combination of a spool and its train of driving-gears, of a handle reciprocating lengthwise on the rod, a spirally-grooved cylinder reciprocated by said handle, two nuts engaging reverse grooves in said cylinder, and clutch mechanism connected to the nuts and alternately engaging one of the spool-moving gears, whereby a movement of the handle in either direction causes a forward movement of the spool, substantially as described.

2. In a fishing-reel, the rod, reciprocating handle, and a cylinder having reverse spiral grooves connected to said handle, two nuts on said cylinder engaging the spirals in reverse directions, a sleeve inclosing both nuts, clutch mechanism by which one or the other nut may engage said sleeve, a train of driving-gears connected to the sleeve, and a winding-spool driven by said train, all combined substantially as described.

3. In a fishing-reel, the rod, the reciprocating handle thereon, the double-grooved cylinder connected to said handle, the two nuts on said cylinder and the sleeve inclosing the same, and the rolls inclosed between the sleeve and nuts and acting alternately as described, combined with the winding-gear and its train, substantially as described.

4. In a fishing-reel, the hollow rod, a reciprocating handle on the same forward of the reel, gear mechanism connected to said handle, substantially as described, whereby the spool may be rotated by the reciprocation of said handle, a hand-grip on the rod behind the reel, and a lever within reach of the hand when grasping the butt-piece, said lever serving to connect or disconnect the spool-driving gear, all combined substantially as described.

5. In a reel, the combination with a reciprocating handle and driving-gears operating the spool by the reciprocation of the said handle, a clutch in the train of gears by which the same may be uncoupled, a thumb-lever by which said clutch may be uncoupled, and mechanism controlled by the thumb-lever, by which the gears may be held uncoupled, substantially as described.

6. In a reel, the driving-gears, the spool, and a clutch by which the driving-gears are operatively connected to the spool, a rock-shaft supported by the frame, a lever connected to said rock-shaft and acting to disengage said clutch, as described, and a slip-sleeve on the rock-shaft engaging the frame in position to hold the clutch uncoupled, all combined substantially as described.

7. In a reel of the character described, the driving-gears and a clutch for engaging or disengaging said gears, a rock-shaft and connections extending to the clutch by which the same may be disengaged, the drag, and connections from the rock-shaft by which the drag may be applied as the rock-shaft operates to disengage the driving-gears, all combined substantially as described.

8. In a reel of the character described, the driving-gear and a clutch by which the same may be connected and disconnected, a rock-shaft and connections therefrom by which said clutch may be disconnected, and means for locking said clutch in open position, the drag, and means connected to the rock-shaft for applying the drag, all combined.

9. In a fishing-reel, the spool, a curved spring-drag in position to engage one rim of said spool, and the thumb-piece extending outside the casing so that the drag may be operated by hand, and a cam-lever in position to engage the drag, substantially as described.

10. In a fishing-reel, the driving-gears and a clutch in the train, a rock-shaft and lever extending therefrom by which the clutch may be disengaged, the drag and means for applying it by hand, and connections on the rock-shaft by which the drag is automatically applied when the clutch is uncoupled, all combined.

11. In a fishing-reel, the rod, a handle-piece reciprocating lengthwise thereof, a cylinder spirally grooved in reverse directions and connected to the handle, two nuts on the cylinder engaging the reverse spirals, said nuts externally flattened, a sleeve surrounding both nuts and operatively connected to the reel, and clutch-pieces interposed between the nuts and sleeve, whereby the nuts are alternately clutched to the sleeve as the grooved cylinder reciprocates, all combined substantially as described.

12. In a fishing-reel, the combination of the spool, its driving-train, and a sleeve within the rod having geared connections to said train, antifriction-bearings for said sleeve at each end thereof and within the rod, oppositely-rotating nuts having clutch mechanism to engage said sleeve alternately, and a spirally-grooved cylinder engaging said nuts and reciprocated by a handle, all substantially as described.

In testimony whereof we affix our signatures in presence of two witnesses.

WILLIAM TRABUE.
BEN HOWE.

Witnesses:
R. W. BINGHAM,
MARY F. PRICE.